(12) United States Patent
Dettmers

(10) Patent No.: US 6,520,091 B1
(45) Date of Patent: Feb. 18, 2003

(54) SIDEWALL GAME TABLE

(75) Inventor: Peter R. Dettmers, Jupiter, FL (US)

(73) Assignee: DeCrane Aircraft Seating Company, Inc., Peshtigo, WI (US)

( * ) Notice: Subject to any disclaimer, the term of this patent is extended or adjusted under 35 U.S.C. 154(b) by 0 days.

(21) Appl. No.: 09/952,882

(22) Filed: Sep. 13, 2001

(51) Int. Cl.[7] ............................................... A47B 23/00
(52) U.S. Cl. ........................................... 108/42; 108/44
(58) Field of Search .............................. 108/42, 44, 47, 108/48, 35, 36, 37, 40, 41, 145, 152

(56) References Cited

U.S. PATENT DOCUMENTS

| | | | | |
|---|---|---|---|---|
| 844,732 A | * | 2/1907 | Miller | |
| 1,420,206 A | * | 6/1922 | Milam | |
| 5,086,527 A | * | 2/1992 | Takahashi et al. | |
| 5,381,738 A | * | 1/1995 | Meyer | |
| 5,669,314 A | * | 9/1997 | Grant | |
| 5,713,404 A | * | 2/1998 | Ladewig | |
| 5,775,655 A | * | 7/1998 | Schmeets | |

* cited by examiner

Primary Examiner—José V. Chen
(74) Attorney, Agent, or Firm—Blakely, Sokoloff, Taylor & Zafman LLP

(57) ABSTRACT

A table deployment mechanism is disclosed. In various embodiments, the table deployment mechanism utilizes vertical slides in conjunction with scissor members and a gas spring coupled to the scissor members in order to facilitate movement of the deployment mechanism between a retracted position and a deployed position despite any stresses which may be imparted to the deployment mechanism.

19 Claims, 5 Drawing Sheets

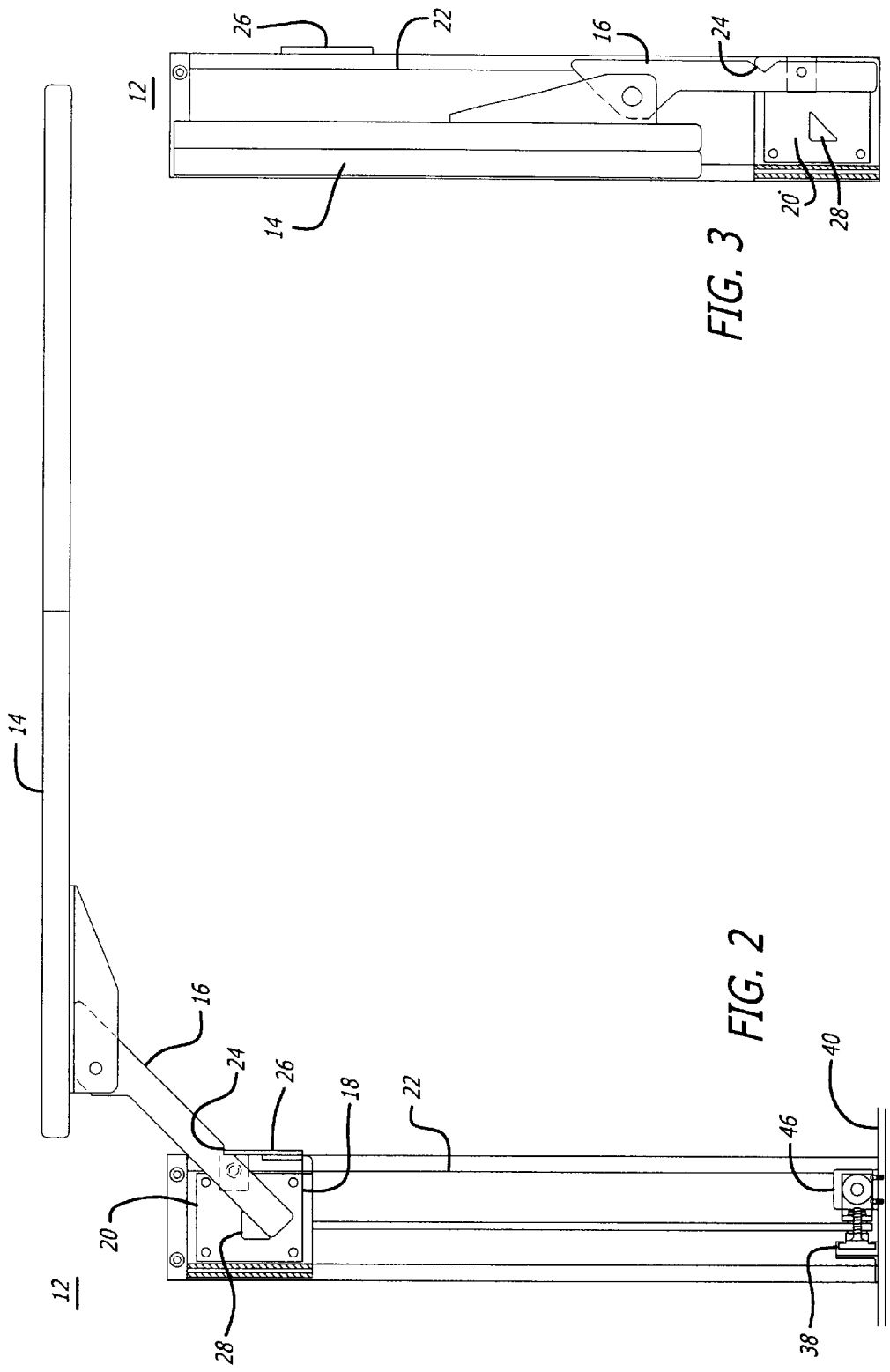

SIDEWALL GAME TABLE

FIELD OF THE INVENTION

The present invention relates to a retractable table for aircraft, recreational vehicles and the like, and relates more particularly to a retractable table which is deployed using a scissor mechanism in combination with a gas spring.

BACKGROUND

Many airplanes and recreational vehicles ("RVs") have retractable tables such that passengers may deploy the table when needed for purposes such as eating, reading or writing. Once the user no longer requires a table surface, the retractable table may generally fold or rotate or otherwise be moved to a retracted position.

Generally, these retractable tables use a deployment mechanism which includes a rack and pinion system to guide movement of the table. However, in certain applications, this system is not optimal. For example, during takeoff and landing, an airplane experiences significant in-flight stresses such as deflection of the air frame, which can cause problems with operation of the rack and pinion system. Specifically, when the rack and pinion system experiences such in-flight stress, the mechanism can become lodged or jammed, preventing deployment or retraction of the table by the user. Moreover, if the table is relatively large, the weight of the table can be difficult to maneuver between the deployed and retracted position and vice versa.

SUMMARY

Various embodiments disclosed herein provide a retractable table which uses slidable guide members to guide the table between a retracted position and a deployed position. Moreover, scissor members are used in conjunction with a gas spring to facilitate deployment of the table.

In various embodiments, a support arm, which holds the table, has a notch formed therein, such that a cross member coupled to the guide members rests within the notch when the table is deployed to assist in supporting the weight of the table and any items that might be placed upon the table. The gas spring also assists in maintaining the table in a deployed position by exerting force on the scissor members, which must be overcome before the table can be returned to the retracted position.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

FIG. 2 is a side view of an embodiment in a deployed position.

FIG. 3 is a side view of the retracted position of the embodiment shown in FIG. 2.

DETAILED DESCRIPTION

The various embodiments discussed herein overcome the problems in the existing art described above by providing a table deployment mechanism which uses slidable guides to guide the table deployment mechanism and scissor members coupled to a gas spring in order to assist in the deployment of the table. In the following description, for purposes of explanation, numerous specific details are set forth in order to provide a thorough understanding of the various embodiments. It will be apparent, however, to one skilled in the art that the various embodiments may be practiced without some of these specific details. The following description and accompanying drawings provide examples for the purposes of illustration. However, these examples should not be construed in a limiting sense and they are not intended to provide an exhaustive list of all possible implementation.

Figure 1:
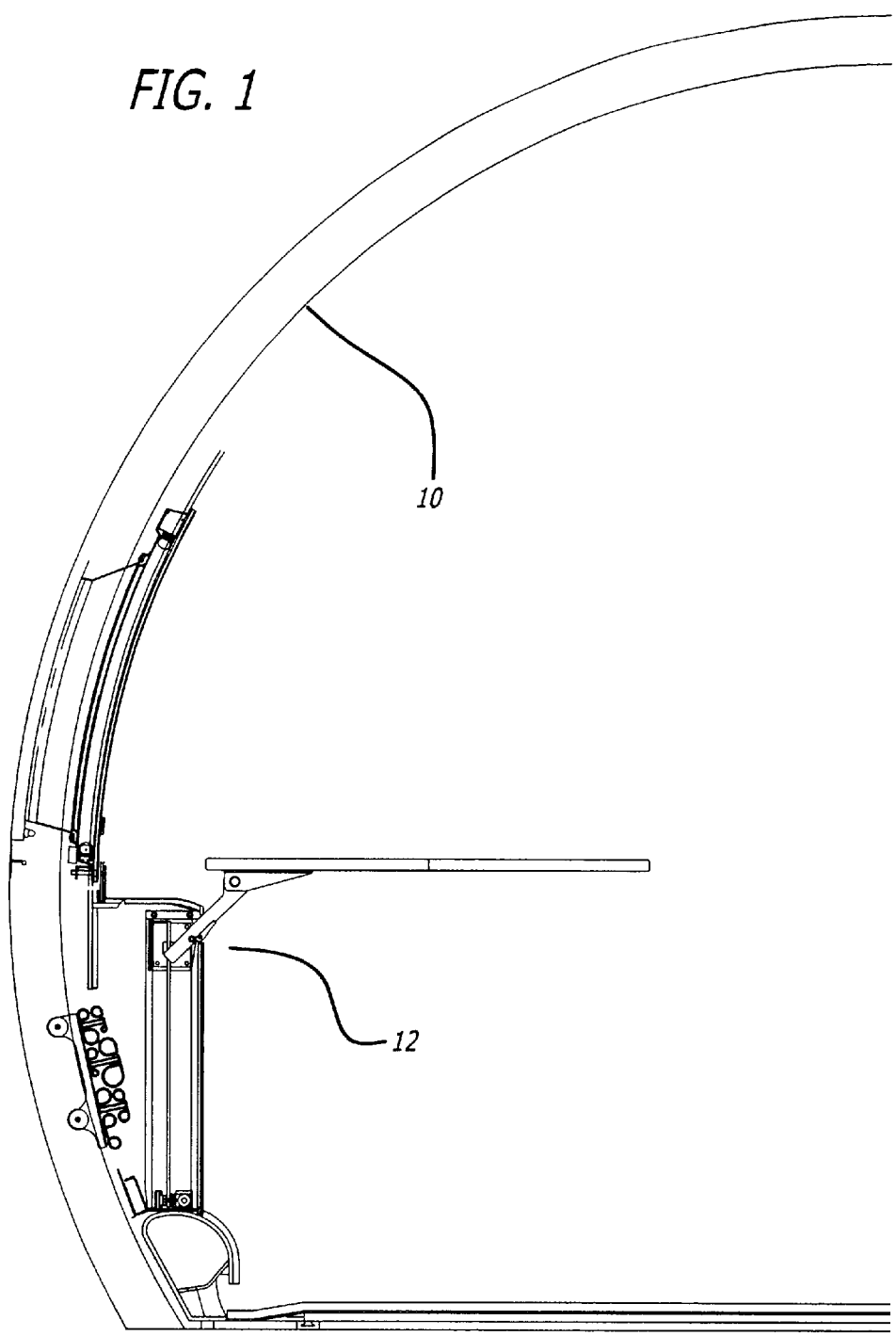
FIG. 1 is a side view of an embodiment in which the retractable table is in a deployed position as it would be used in conjunction with an aircraft.

Referring now to FIG. 1, retractable table 12 is shown positioned within fuselage 10 of an aircraft. Although the various embodiments described herein relate mainly to aircraft usage, it is contemplated that the various embodiments are also suited for use in conjunction with RVs or other vehicles or dwellings in which a retractable table mechanism would be useful.

Turning now to FIG. 2, retractable table 12 is shown in greater detail. Specifically, retractable table 12 has table portion 14 pivotally coupled to support arm 16 such that table portion 14 may pivot relative to support arm 16 during deployment and retraction. Support arm 16 is pivotally coupled to stabilizer 18, which has a first end and a second end.

Each end of stabilizer 18 is coupled to a guide member. In the embodiment shown, the guide member comprises slider and track 22. Each slider 20 is slidably coupled to a separate track 22 such that vertical movement of stabilizer 18 imparts movement to each slider 20 commensurate with the movement of stabilizer 18 between a deployed position shown in FIG. 2 and a retracted position shown in FIG. 3. It is worth noting that each track 22 is coupled to base 40 for support. In an embodiment, slider 20 and track 22 are of a type similar to the linear slide mechanisms commercially available from Igus, Inc. sold under the name DryLin® N80 or N40.

In various embodiments, stop 28 is disposed on at least one of stabilizer 18 and slider 20 such that when support arm 16 is deployed, stop 28 prevents support arm 16 from moving past the deployed position. In addition, support arm 16 has a notch 24 formed therein (best seen in FIG. 3) such that when support arm 16 is in the deployed position, cross member 26, which is coupled to each track 22, resides within notch 24. Notch 24 and stop 28 advantageously provide for support arm 16 to be properly seated in the deployed position and add support for table portion 14.

FIG. 3 shows the embodiment of FIG. 2 in a retracted position such that table portion 14 is folded for retraction and support arm 16 has been swiveled counter clockwise for retraction.

Figure 4:
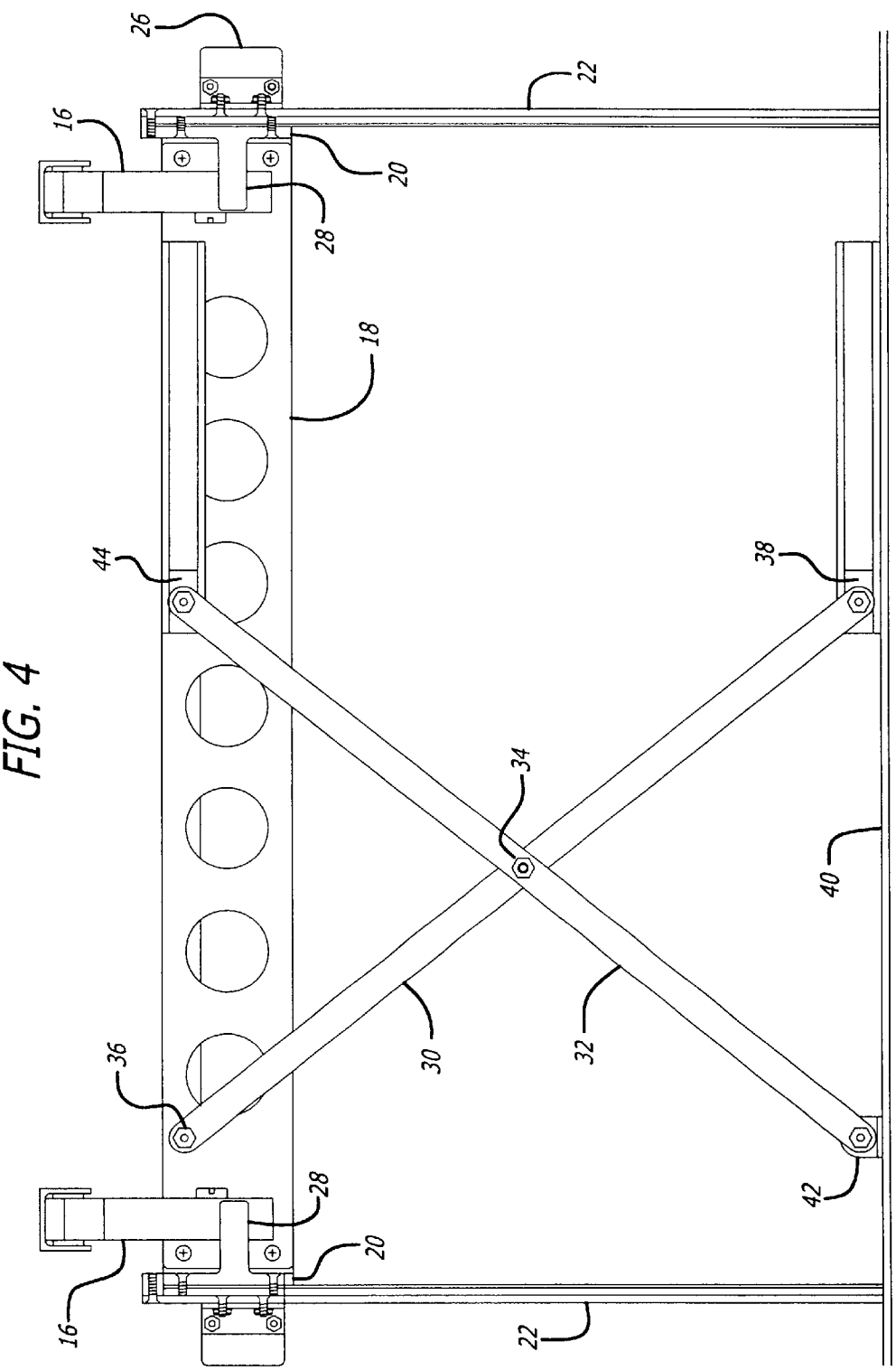
FIG. 4 is a rear view of an embodiment in the deployed position.

Turning now to FIG. 4, scissor members according to an embodiment are shown. Specifically, scissor member 30 has a first end, a second end, and an intermediate region between the first and second end. Scissor member 32, likewise, has a first end, a second end, and an intermediate region between the first end and the second end.

Scissor member 30 and scissor member 32 are pivotally coupled at their intermediate regions by pivot coupling 34. First scissor member 30 has a first end pivotally coupled to stabilizer 18 at fixed point 36, and the second end of scissor member 30 is pivotally coupled to slider 38, which is coupled to base 40. Similarly, scissor member 32 has a first end pivotally coupled to base 40 at fixed point 42 and a second end pivotally coupled to slider 44, which is coupled to stabilizer 18.

This construction advantageously provides for smooth uninterrupted movement of stabilizer 18 (and, therefore, of table portion 14) between a retracted position and a deployed position despite any in-flight stresses, which the device may undergo while being used in an aircraft. Similarly, the scissor members also provide improved movement of the stabilizer in other vehicles which may experience other types of stresses which have been known to de-rail, lodge, or otherwise cause failure of conventional table deployment mechanisms.

Figure 5:
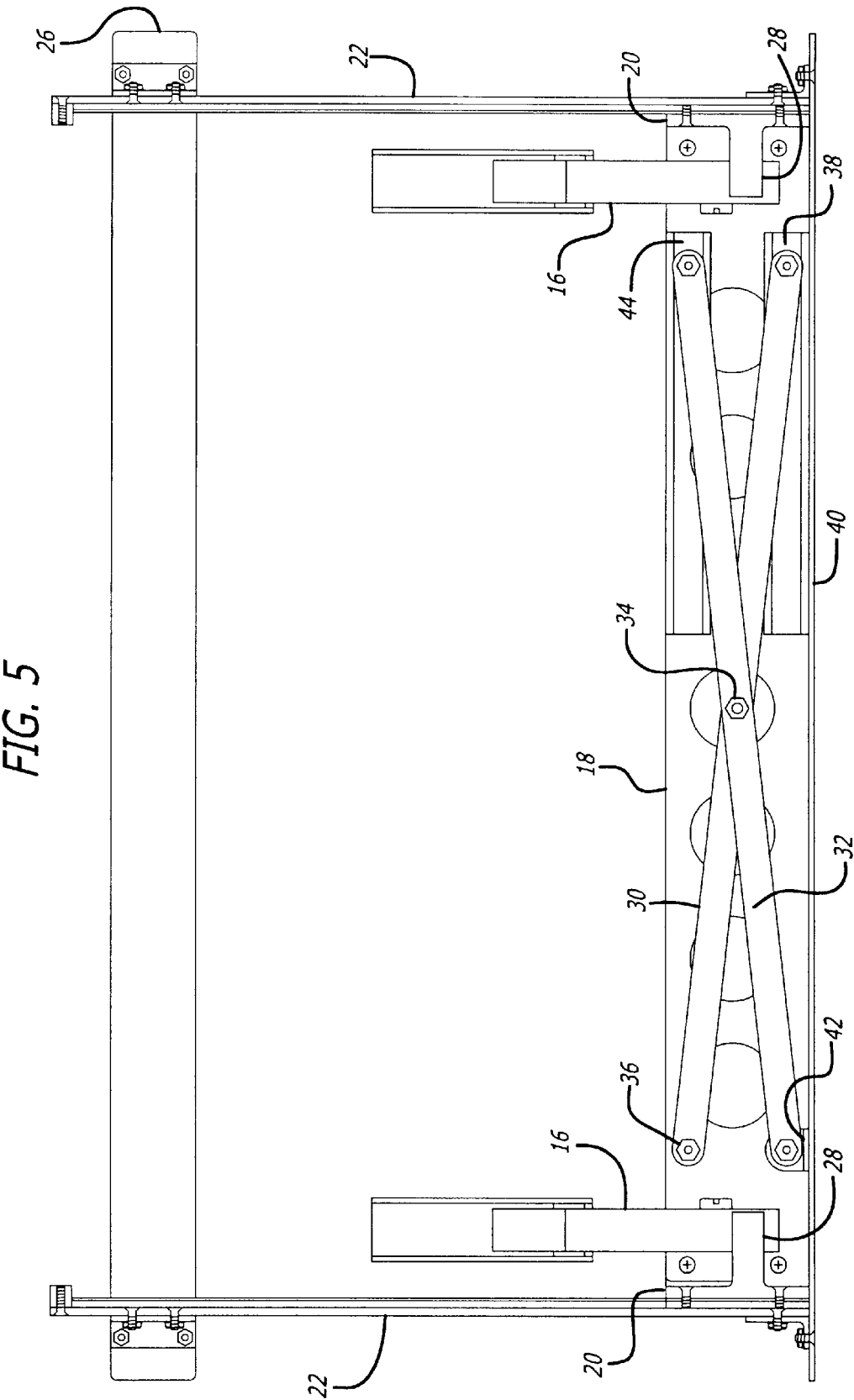
FIG. 5 is a rear view of the retracted position of the embodiment shown in FIG. 4.

FIG. 5 shows the embodiment of FIG. 4 in a retracted position such that scissor members 30 and 32 are collapsed. In addition, support arms 16 have been rotated upwards for retraction.

Figure 6:
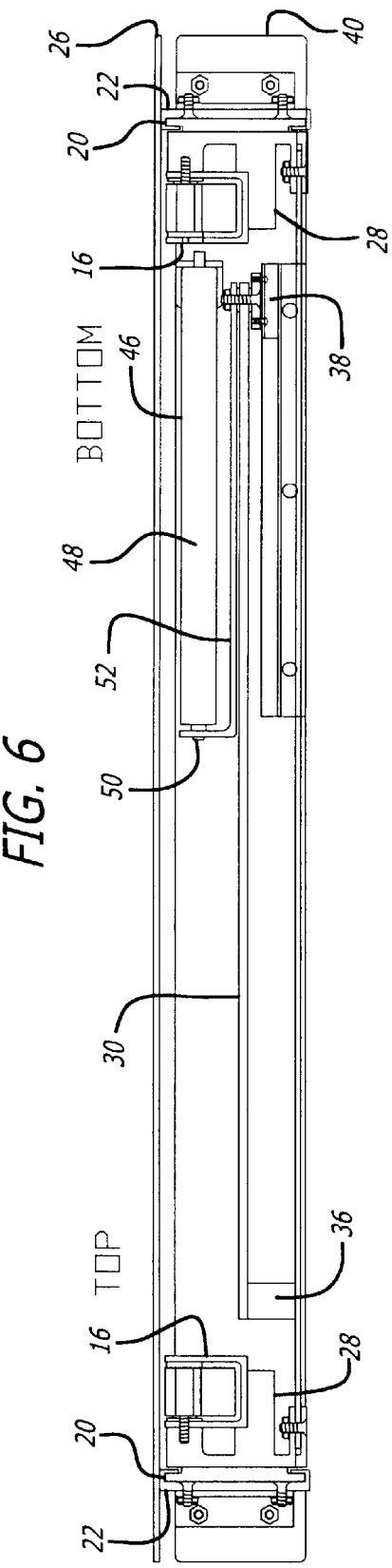
FIG. 6 is a top view of an embodiment showing only one scissor member coupled to the gas spring.

Turning now to FIG. 6, a top view is shown with scissor member 32 omitted for the purpose of discussion only. As can be seen, the embodiment shown is in a retracted position since slider 38 is moved all the way to the right. In addition, gas spring 46 is attached to base 40.

Gas spring 46 has cylinder portion 48 and piston portion 50. In the embodiment shown, cylinder portion 48 is coupled to base 40, and piston portion 50 is coupled by coupling link 52 to slider 38 to assist in deployment of retractable table 12. In other embodiments, piston portion 50 is coupled to base 40 while cylinder portion 48 is coupled by coupling link 52 to slider 38. It is also worth noting that any spring which is capable of imparting force to the scissor mechanism in a similar fashion as gas spring 46 could be used.

Gas spring 46 assists in deployment of the mechanism by imparting additional force to scissor member 30 through slider 38 to push scissor mechanism (scissor members 30 and 32) towards a deployed position. This permits for a larger and/or sturdier table portion 14 to be used since the user need not lift the entire weight of table portion 14 since gas spring 46 assists in raising table portion 14.

Figure 7:
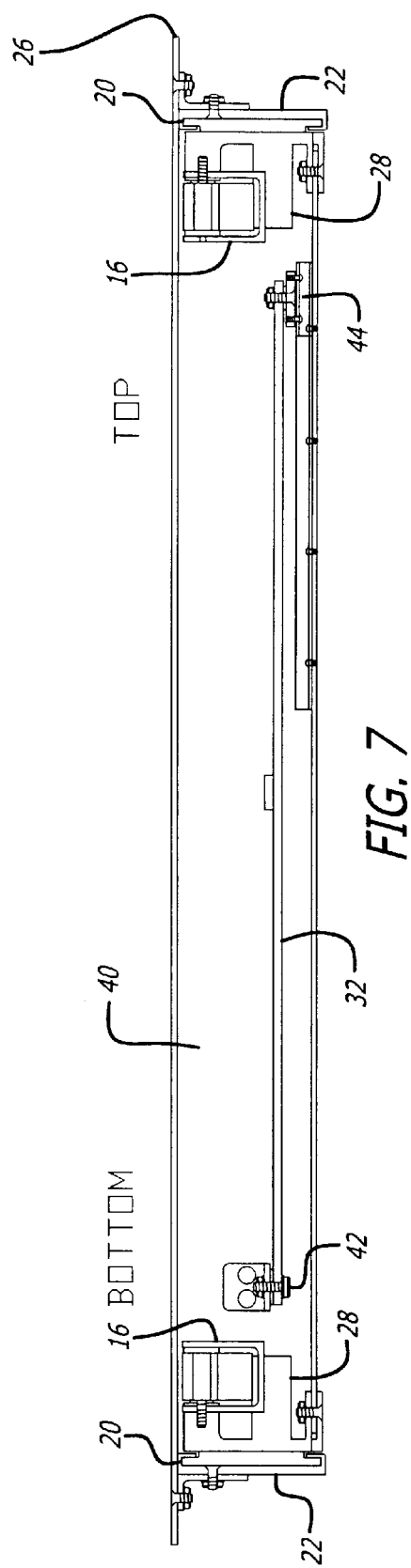
FIG. 7 is a top view showing the other scissor member, which is not shown in FIG. 6.

FIG. 7 shows scissor member 32, also in the retracted position, as it would be seen in the embodiment shown in FIG. 6. As can be seen, slider 44 is moved all the way to the right in FIG. 7 since the deployment mechanism is in the retracted position.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

I claim:

1. A table deployment mechanism comprising:

a stabilizer having a first end and a second end;

a first guide member coupled to the first end of the stabilizer and to a base;

a second guide member coupled to the second end of the stabilizer and to the base, the guide members to guide the stabilizer between a retracted position and a deployed position;

scissor members coupled to the stabilizer and to the base, the scissor members comprising a first scissor member having a first end, a second end, and an intermediate region between the first end and the second end, and a second scissor member having a first end, a second end, and an intermediate region between the first end and the second end, the intermediate region of the first scissor member pivotally coupled to the intermediate region of the second scissor member, the first end of the first scissor member pivotally coupled to the stabilizer at a fixed point, the second end of the first scissor member pivotally coupled to a first slider coupled to the base, the first end of the second scissor member pivotally coupled to the base at a fixed point, the second end of the second scissor member pivotally coupled to a second slider coupled to the stabilizer; and a spring having a first end coupled to the base and a second end coupled to the first slider.

2. The table deployment mechanism of claim 1, wherein the guide members each comprise:

a track; and a slider slidably coupled to the track.

3. The table deployment mechanism of claim 1, wherein the spring is a gas spring comprising:

a cylinder portion; and a piston portion, the gas spring having at least one of the cylinder portion and the piston portion coupled to the base and the other of the cylinder portion and the piston portion coupled to the first slider.

4. The table deployment mechanism of claim 1, further comprising:

a support arm; and a stop, the stop positioned to stop the support arm from moving past a deployed position.

5. The table deployment mechanism of claim 4, wherein the stop is coupled to the stabilizer.

6. The table deployment mechanism of claim 4, wherein the stop is coupled to at least one of the guide members.

7. A retractable table comprising:

a table portion;

a support arm pivotally coupled to the table portion;

a stabilizer pivotally coupled to the support arm, the stabilizer having a first end and a second end;

a first guide member coupled to the first end of the stabilizer and to a base;

a second guide member coupled to the second end of the stabilizer and to the base, the guide members to guide the stabilizer between a retracted position and a deployed position;

scissor members coupled to the stabilizer and to the base, the scissor members comprising a first scissor member having a first end, a second end, and an intermediate region between the first end and the second end, and a second scissor member having a first end, a second end, and an intermediate region between the first end and the second end, the intermediate region of the first scissor member pivotally coupled to the intermediate region of the second scissor member, the first end of the first scissor member pivotally coupled to the stabilizer at a fixed point, the second end of the first scissor member pivotally coupled to a first slider coupled to the base, the first end of the second scissor member pivotally coupled to the base at a fixed point, the second end of the second scissor member pivotally coupled to a second slider coupled to the stabilizer; and a spring having a first end coupled to the base and a second end coupled to the first slider.

8. The retractable table of claim 7, wherein the guide members each comprise:

a track; and a slider slidably coupled to the track.

9. The retractable table of claim 7, wherein the spring is a gas spring comprising:

a cylinder portion; and a piston portion, the gas spring having at least one of the cylinder portion and the piston portion coupled to the base and the other of the cylinder portion and the piston portion coupled to the first slider.

10. The retractable table of claim 7, further comprising:

a stop, the stop positioned to stop the support arm from moving past a deployed position.

11. The retractable table of claim 10, wherein the stop is coupled to the stabilizer.

12. The retractable table of claim 10, wherein the stop is coupled to at least one of the guide members.

13. The retractable table of claim 7, further comprising:

a cross member coupled to the guide members; and a notch formed in the support arm such that, in a deployed position, a portion of the cross member resides within the notch.

14. A retractable table for use in combination with a vehicle, the combination comprising:

a table portion;

a support arm pivotally coupled to the table portion;

a stabilizer pivotally coupled to the support arm, the stabilizer having a first end and a second end;

a first guide member coupled to the first end of the stabilizer and to a base which is coupled to a portion of the vehicle;

a second guide member coupled to the second end of the stabilizer and to the base, the guide members to guide the stabilizer between a retracted position and a deployed position;

scissor members coupled to the stabilizer and to the base, the scissor members comprising a first scissor member having a first end, a second end, and an intermediate region between the first end and the second end, and a second scissor member having a first end, a second end, and an intermediate region between the first end and the second end, the intermediate region of the first scissor member pivotally coupled to the intermediate region of the second scissor member, the first end of the first scissor member pivotally coupled to the stabilizer at a fixed point, the second end of the first scissor member pivotally coupled to a first slider coupled to the base, the first end of the second scissor member pivotally coupled to the base at a fixed point, the second end of the second scissor member pivotally coupled to a second slider coupled to the stabilizer; and a spring having a first end coupled to the base and a second end coupled to the first slider.

15. The combination of claim 14, wherein the vehicle is an aircraft.

16. The combination of claim 14, wherein the guide members each comprise:

a track; and a slider slidably coupled to the track.

17. The combination of claim 14, wherein the spring is a gas spring comprising:

a cylinder portion; and a piston portion, the gas spring having at least one of the cylinder portion and the piston portion coupled to the base and the other of the cylinder portion and the piston portion coupled to the first slider.

18. The combination of claim 14, further comprising:

a stop, the stop positioned to stop the support arm from moving past a deployed position.

19. The combination of claim 14, further comprising:

a cross member coupled to the guide members; and a notch formed in the support arm such that, in a deployed position, a portion of the cross member resides within the notch.

* * * * *